United States Patent [19]

Kaplan

[11] Patent Number: 5,903,635
[45] Date of Patent: May 11, 1999

[54] ADVERTISING EFFECTIVENESS RATING SYSTEM

[75] Inventor: Alan Edward Kaplan, Morristown, N.J.

[73] Assignee: AT&T Corp., Middletown, N.J.

[21] Appl. No.: 08/844,423

[22] Filed: Apr. 18, 1997

[51] Int. Cl.[6] .................................................. H04M 15/00
[52] U.S. Cl. ....................... 379/133; 379/111; 379/113; 379/137; 348/1
[58] Field of Search .................................. 379/111, 112, 379/113, 115, 120, 121, 124, 133, 134, 136, 139, 207, 265, 266, 309, 137; 348/1, 2; 455/2

[56] References Cited

U.S. PATENT DOCUMENTS

| | | | |
|---|---|---|---|
| 3,560,658 | 2/1971 | Molloy et al. | 379/139 |
| 5,448,625 | 9/1995 | Llederman | 379/67 |
| 5,636,346 | 6/1997 | Saxe | 348/1 |
| 5,740,234 | 4/1998 | Black et al. | 379/115 |
| 5,825,769 | 10/1998 | O'Reilly et al. | 379/113 |

*Primary Examiner*—Paul Loomis
*Assistant Examiner*—Binh K. Tieu

[57] ABSTRACT

An advertising effectiveness rating system provides advertising effectiveness rating data by assigning one telephone number to each of a plurality of advertising outlets and counting the number of times that each of the assigned telephone numbers are used. The advertising effectiveness rating system includes an advertising effectiveness rating device that receives a called number from a local switch. When a prospective purchaser calls one of the assigned telephone numbers, the local switch forwards the called number to the advertising effectiveness rating device. When a called number is received, the advertising effectiveness rating device retrieves a count that corresponds to the called number from a database, increments the count and returns the incremented count to the database. When a request for advertising effectiveness rating data is received, a controller of the advertising effectiveness rate device retrieves the database, formats the data in the database, and outputs the formatted data as the advertising effectiveness rating data.

20 Claims, 4 Drawing Sheets

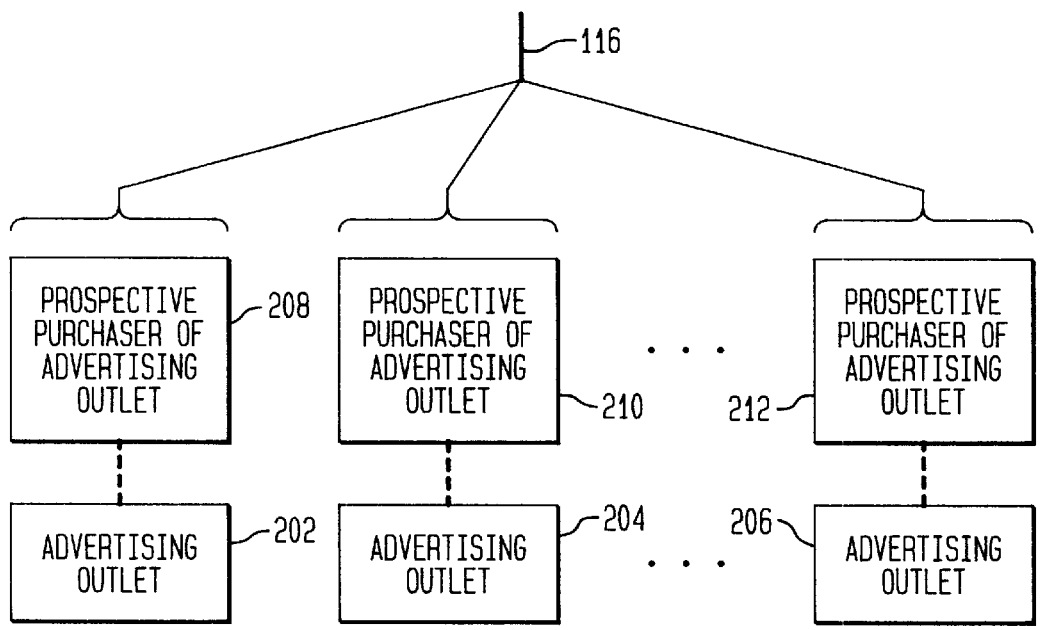
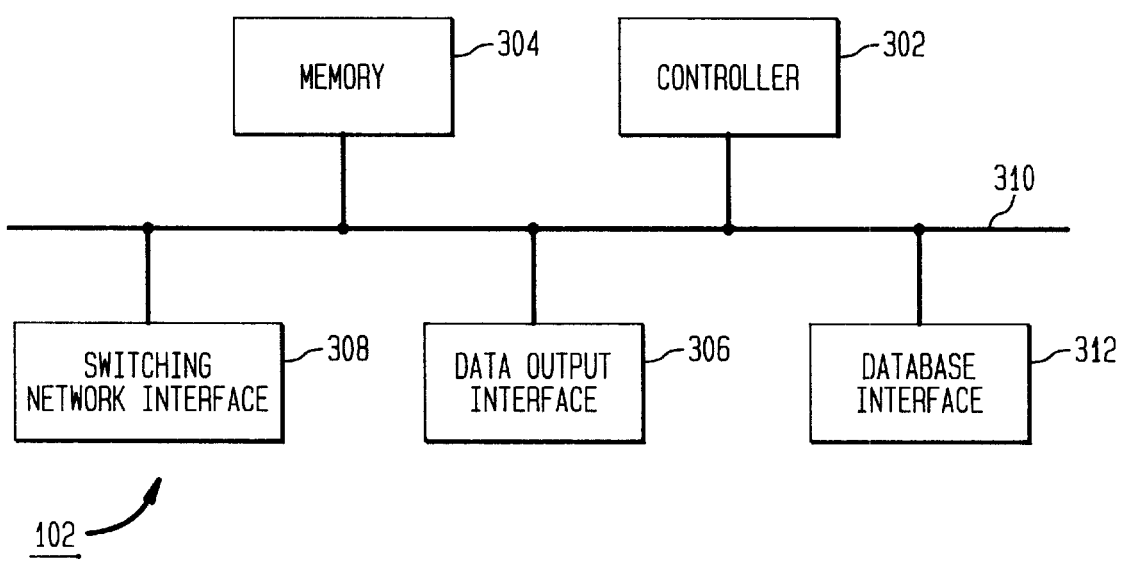

| | 402 | 404 | 406 |
|---|---|---|---|
| 408 | CALLED TELEPHONE NUMBER | COUNT | ADVERTISING OUTLET |
| 410 | CALLED TELEPHONE NUMBER | COUNT | ADVERTISING OUTLET |
| ⋮ | ⋮ | ⋮ | ⋮ |
| 412 | CALLED TELEPHONE NUMBER | COUNT | ADVERTISING OUTLET |

118

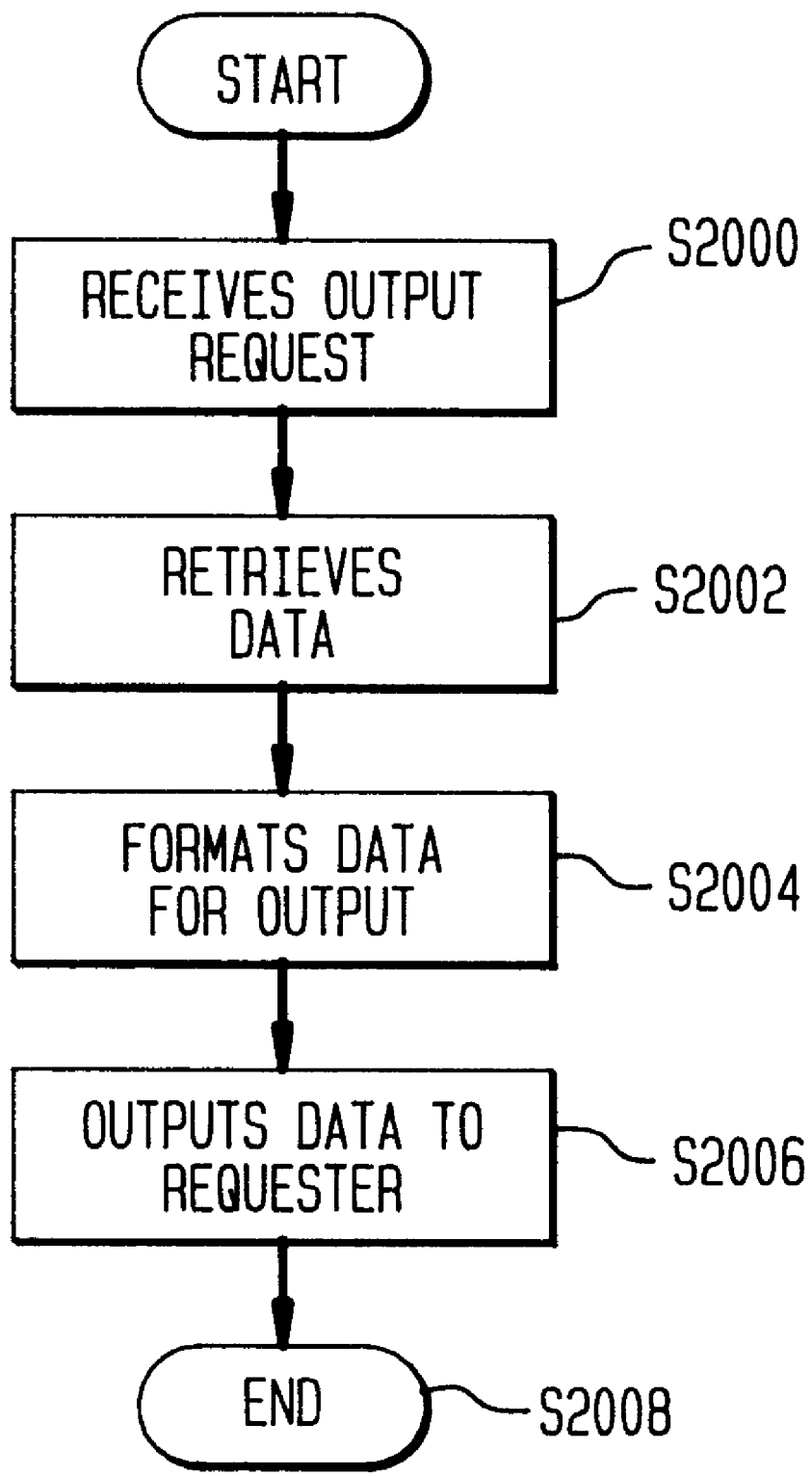

ADVERTISING EFFECTIVENESS RATING SYSTEM

BACKGROUND OF THE INVENTION

1. Field of Invention

This invention relates to an apparatus and method for providing advertising effectiveness ratings.

2. Description of Related Art

Advertisements for products and services are often distributed to purchasers through many different methods such as by radio, television, newspaper, etc. Often, advertisement outlets include a telephone number that an interested purchaser can call to inquire regarding the advertised product or service. However, there is currently no method for assessing advertisement outlet effectiveness based on prospective purchaser responses through the telephone switching network. Thus, there is a need for providing a device and method for determining advertising effectiveness based on telephone responses.

SUMMARY OF THE INVENTION

An advertising effectiveness rating system provides an advertising effectiveness rating by assigning one telephone number to each of a plurality of advertising outlets and counting the number of times that each of the assigned telephone numbers is used. The advertising effectiveness rating system includes an advertising effectiveness rating device that receives a called number from a local switch. When a prospective purchaser calls a supplier using one of the assigned telephone numbers (a called number) the local switch connects the supplier to the prospective purchaser and forwards the called number and optionally a calling number to the advertising effectiveness rating device. When the called number is received, the advertising effectiveness rating device retrieves a count from the database that corresponds to the called number. The count is incremented and returned to the database.

When a request for an advertising effectiveness rating is received by the advertising effectiveness rating device, a controller retrieves the database, formats information in the database based on predetermined formats using predetermined methods, and outputs the formatted data as the advertising effectiveness rating.

BRIEF DESCRIPTION OF THE DRAWINGS

The invention is described in detail with reference to the following drawings, wherein like numerals represent like elements:

FIG. 2 is a diagram showing multiple advertising outlets and responses to each of the advertising outlets through a single telephone line;

FIG. 3 is a block diagram of an advertising effectiveness rating device;

FIG. 6 is a flowchart for outputting advertising effectiveness rating data responding to a request.

DETAILED DESCRIPTION OF PREFERRED EMBODIMENTS

Figure 1:
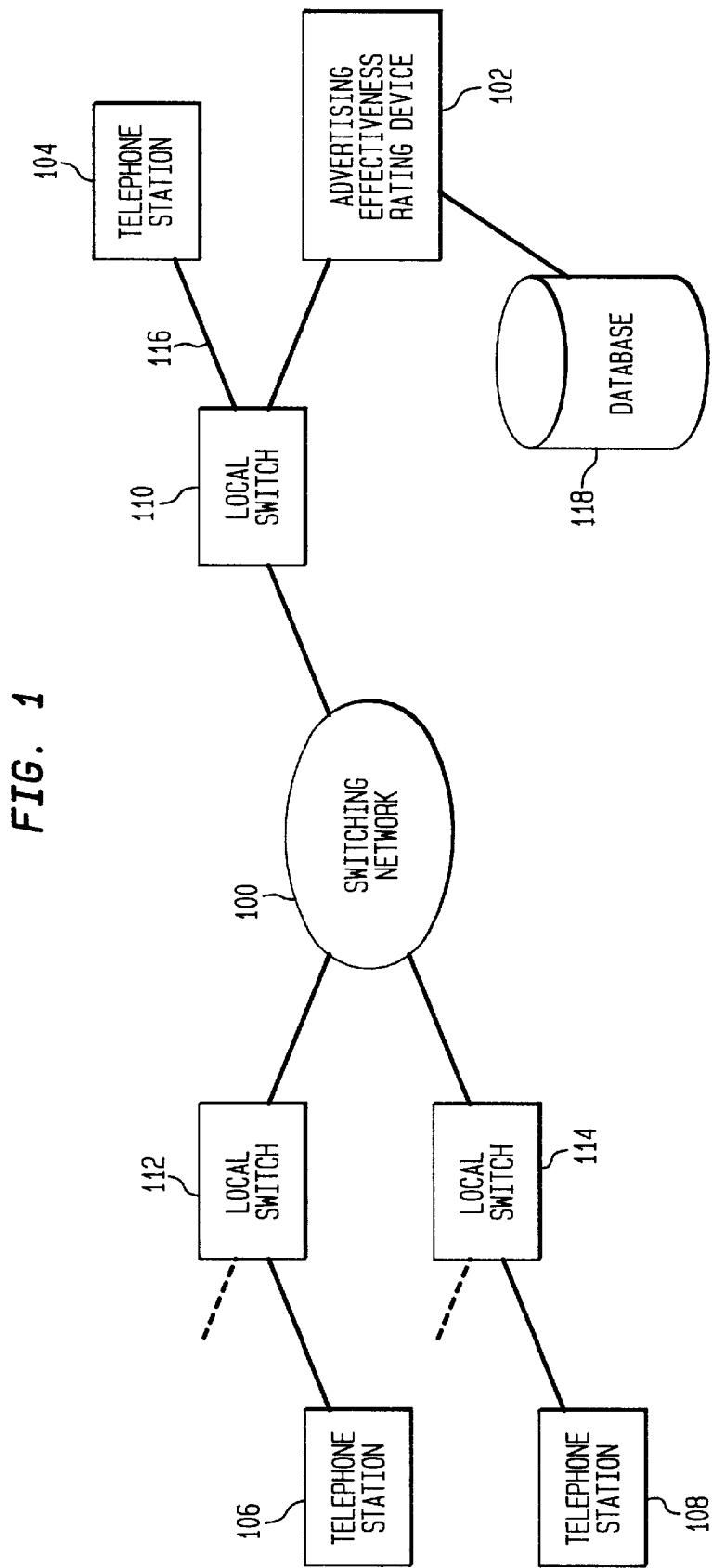
FIG. 1 is a diagram of an advertising effectiveness rating system.

FIG. 1 shows an advertising effectiveness rating system that includes an advertising effectiveness rating device 102 coupled to a switching network 100 through a local switch 110. Telephone stations 104, 106 and 108 are also coupled to the switching network 100 through local switches 110, 112 and 114, respectively. The telephone station 104 is coupled to the local switch 110 through telephone signal line 116 and may be a supplier's telephone station and telephone stations 106 and 108 may be prospective purchasers' telephone stations, for example. Advertisements are distributed to prospective purchasers through various advertising outlets such as newspapers, radio, television, etc. A telephone number may be presented within the advertisement of each advertising outlet so that prospective purchasers of advertised devices and services may contact the suppliers for more information or for ordering. Thus, a prospective purchaser may use the telephone station 106 to contact a supplier at the telephone station 104 using a first telephone number.

When the telephone call from the telephone station 106 is received, the local switch 110 determines that the telephone station 104 is called and connects the call from the telephone station 106 to the telephone station 104 through the telephone signal line 116. The local switch 110 also forwards the first telephone number as the called number to the advertising effectiveness rating device 102. The local switch 110 may also forward the calling number so that multiple calls from the same calling number may be counted as one call, for example. Also, records may be maintained for each prospective purchaser, for example.

The advertising effectiveness rating device 102 receives the called number from the local switch 110 and updates a database 118 that is coupled to the advertising effectiveness rating device 102, so that a number of times that the called number has been called is recorded, for example. The database may contain an entry that has a count corresponding to the called number and the advertising effectiveness rating device 102 increments the count every time a call is received for the called number. Records may also be kept for each called and calling number pair related to a time and a date of the call, for example.

Another prospective purchaser using the telephone station 108 may call the supplier at the telephone station 104 based on a second telephone number presented by a second advertising outlet, such as another newspaper, for example. When the telephone station 108 calls the second telephone number, the local switch 110 again receives the call and connects the telephone station 108 with the telephone station 104 and forwards the second telephone number as the called number to the advertising effectiveness rating device 102.

When the advertising effectiveness rating device 102 receives the called number, the database 118 is again accessed and an appropriate entry of the database 118 is updated. Thus, the advertising effectiveness rating device 102 maintains the database 118 so that the information in the database 118 may be used to generate advertising effectiveness rating for different advertising outlets.

More than one advertising outlet may be assigned the same number. For example, if advertisements are printed in several newspapers and commercials are aired through a radio station and a television station, the same telephone number may be used for all newspapers while a different number may be used for the radio and television commercials. The resulting advertising effectiveness rating provides comparative results between printed advertising and aired commercials using only two telephone numbers instead of at least four telephone numbers.

FIG. 2 shows advertising outlets 202, 204 and 206. Advertising outlet 202 may be a metropolitan newspaper while advertising outlet 204 may be a rural newspaper and advertising outlet 206 may be a radio station. One telephone number is assigned for each of the advertising outlets 202, 204 and 206. Prospective purchasers reached by each of the advertising outlets 202, 204 and 206, contact the supplier, for example, by calling the supplier using the respective assigned telephone numbers.

For example, prospective purchasers 208, 210 and 212 of advertising outlets 202, 204 and 206, respectively, calls the supplier at the telephone station 104 through the telephone signal line 116. While each of the prospective purchasers dials a different telephone number, all the telephone numbers may be mapped to the same telephone signal line 116 by the local switch 110. The local switch 110 sends to the advertising effectiveness rating device 102 all of the telephone numbers called by the prospective purchasers so that the database 118 may be updated accordingly.

All the telephone numbers may also be mapped to more than one signal line (a hunt group), for example, if multiple lines are used. If the lines are connected to different local switches 110, 112 and 114, the local switches 112 and 114, for example, sends the called number to the advertising effectiveness rating device 102 through the local switch 110.

FIG. 3 shows a block diagram of the advertising effectiveness rating device 102. The advertising effectiveness rating device 102 includes a controller 302, a memory 304, a data output interface 306, a telephone switching network interface 308 and a database interface 312 that interfaces with the database 118. All the above components are coupled together through a signal bus 310. While FIG. 3 shows the database 118 being coupled to the advertising effectiveness rating device 102 through database interface 312, the database 118 may also be incorporated in the memory 304 or the local switch 110.

When the local switch 110 sends a called number to the advertising effectiveness rating device 102, the called number (and optionally the calling number) is received by the telephone switching network interface 308 and transferred to the controller 302. The controller 302 retrieves an entry of the database 118 that corresponds to the called number through the database interface 312 and updates the database by incrementing a count, for example, and returning the updated information to the database 118 through the database interface 312. If the database 118 is incorporated in the memory 304, the controller 302 directly accesses the database 118 from the memory 304 and updates it accordingly.

Figures 4, 5:
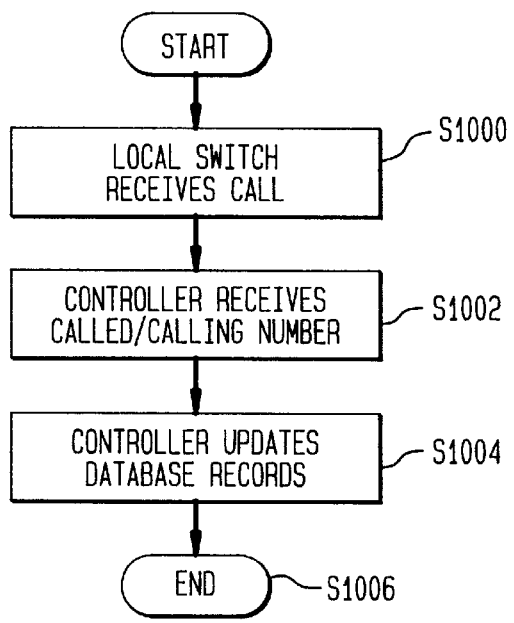
FIG. 4 is a diagram of a database updated by the advertising effectiveness rating device.
FIG. 5 is a flowchart of a process for updating the database shown in FIG. 4.

FIG. 4 shows an exemplary embodiment of the database 118. The database 118 may contain entries 408, 410 and 412 where each entry may contain a telephone number 402, a count 404 and an identification of the corresponding advertising outlet 406. When the controller 302 receives a called number, the database 118 is searched for an entry 408, 410 and 412 that contains a telephone number 402 that corresponds to the called number. When the entry 408, 410 and 412 is found, the corresponding count 404 is retrieved and incremented by the controller 302 and the new count 404 is returned to the database 118.

When a request for advertising effectiveness rating data is received by the controller 302, the controller 302 retrieves the database 118 from either the memory 304 or through database interface 312, and formats the data into predetermined formats such as bar charts, pie graphs, or appropriate listings, and outputs the formatted data as advertising effectiveness rating data. More sophisticated advertising effectiveness ratings may be provided by recording more data in the database 118.

For example, multiple counts 404 may be saved corresponding to each telephone number 402 and advertising outlet 406. The counts 404 may correspond to the number of times the telephone number 402 is called for a specific period of time or at a certain date. Both the period of time and the date may also be recorded for each of the entries 408, 410 and 412 of the database 118. Various graphical presentations of the number of calls for each advertising outlet 406 over time may then be produced so that various business cycles and other factors that may influence purchasing patterns may be correlated with the data recorded in the database 118.

FIG. 5 shows a flow chart of a process for updating the database 118. In step S1000, the local switch 110 receives a call from a prospective purchaser. The process then goes to step S1002. In step S1002, the controller 302 receives the called number (and optionally the calling number) from the local switch 110 and the process goes to step S1004. In step S1004, the controller 302 increments a count 404 retrieved from the database 118 that corresponds to the called number and returns the incremented count 404 to the database 118. Then the process goes to step S1006 and ends.

FIG. 6 shows a process for outputting advertising effectiveness rating data. In step S2000, the controller 302 receives an output request and then goes to step S2002. In step S2002, the controller 302 retrieves the database 118 and then goes to step S2004. In step S2004, the controller 302 formats the data of the database 118 based on predetermined methods and formats and then goes to step S2006. In step S2006, the controller 302 outputs the formatted data as the advertising effectiveness rating data through the data output interface 306 and then goes to step S2008 and ends the process.

An alternative embodiment may be to enhance the caller ID feature currently provided by local switches 110, 112 and 114 to also provide the called number. Normally, the called number is redundant information because each telephone station 106 and 108 is assigned only one telephone number. However, for the telephone station 104, multiple telephone numbers may be assigned. Thus, providing the called number to the telephone station 104 permits the telephone station 104 to perform the advertising effectiveness rating device 102 functions.

For example, the advertising effectiveness rating device 102 may be embodied in a unit coupled to the telephone station 104 or incorporated in the telephone station 104. When a prospective purchaser calls the telephone station 104, the advertising effectiveness rating device 102, now coupled directly to the telephone station 104, receives the called number from the telephone signal line 116 and updates the database 118.

The advertising effectiveness rating device 102 may be equipped with a user interface such as a display, a keyboard and a printer. Using the above devices, a user may request advertising effectiveness rating data by simply entering an appropriate command to output the data through a selected device.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. An advertising effectiveness rating system, comprising:

a telephone switching network;

a local switch coupled to the telephone switching network; and an advertising effectiveness rating device coupled to the local switch, wherein the advertising effectiveness rating device receives a plurality of called numbers from the local switch and updates a database based on the called numbers, each of the called numbers corresponding to at least one of a plurality of advertising outlets.

2. The system of claim 1, wherein the called numbers correspond to a single telephone line.

3. The system of claim 1, wherein the advertising effectiveness rating device comprises:

a telephone switching network interface;

a memory containing the database; and a controller coupled to the telephone switching network and the memory, wherein the controller receives the called numbers through the telephone switching network interface, the controller incrementing a plurality of counts in the database, each of the counts corresponding to one of the called numbers.

4. The system of claim 3, wherein the database has a plurality of entries, each of the entries corresponding to one of the called numbers and containing at least one of the counts and an identification of one of the advertising outlets.

5. The system of claim 4, further comprising a data output interface, when a request is received for advertising effectiveness rating data, the controller retrieves the database from the memory, formats data in the database and outputs the formatted data as advertising effectiveness rating data.

6. The system of claim 3, wherein the advertising effectiveness rating device is either incorporated in a telephone station or coupled to the telephone station.

7. The system of claim 6, wherein the advertising effectiveness rating device further comprises user interfaces, the advertising effectiveness rating device receiving commands through the user interfaces and outputs advertising effectiveness rating data through the user interfaces.

8. The system of claim 7, wherein the user interfaces includes at least one of a keyboard, a display and a printer.

9. The system of claim 1, wherein the advertising effectiveness rating device receives a calling number from the local switch.

10. The system of claim 1, wherein the advertising outlets includes at least one of television, newspaper, and radio.

11. A method for operating an advertising effectiveness rating system that includes an advertising effectiveness rating device, the method comprising:

receiving a plurality of called numbers from a local switch that is coupled to the advertising effectiveness rating device; and updating a database based on the called numbers, each of the called numbers corresponding to at least one of a plurality of advertising outlets.

12. The method of claim 11, wherein the updating step comprises incrementing a plurality of counts in the database, each of the counts corresponding to one of the called numbers.

13. The method of claim 12, wherein the database has a plurality of entries, each of the entries corresponding to one of the called numbers and containing at least one of the counts and an identification of one of the advertising outlets.

14. The method of claim 13, further comprising:

retrieving the database from the memory when a request is received for advertising effectiveness rating data;

formatting data in the database; and outputting the formatted data as the advertising effectiveness rating data.

15. The method of claim 14, further comprising either incorporating the advertising effectiveness rating device into a telephone station or coupling the advertising effectiveness rating device to the telephone station.

16. The method of claim 15, wherein the request is a command received through user interfaces of the advertising effectiveness rating device, the advertising effectiveness rating device responding to the command by outputting the advertising effectiveness rating data through the user interfaces.

17. The method of claim 16, wherein the user interfaces includes at least one of a keyboard, a display and a printer.

18. The method of claim 11, wherein the called numbers correspond to a single telephone line.

19. The method of claim 11, wherein the advertising effectiveness rating device receives a calling number from the local switch.

20. The method of claim 11, wherein the advertising outlets includes at least one of television, newspaper, and radio.

* * * * *